Sept. 11, 1962 J. McCREATH WILSON 3,053,631
METHODS OF PRODUCING SILICON OF HIGH PURITY
Original Filed Aug. 4, 1956
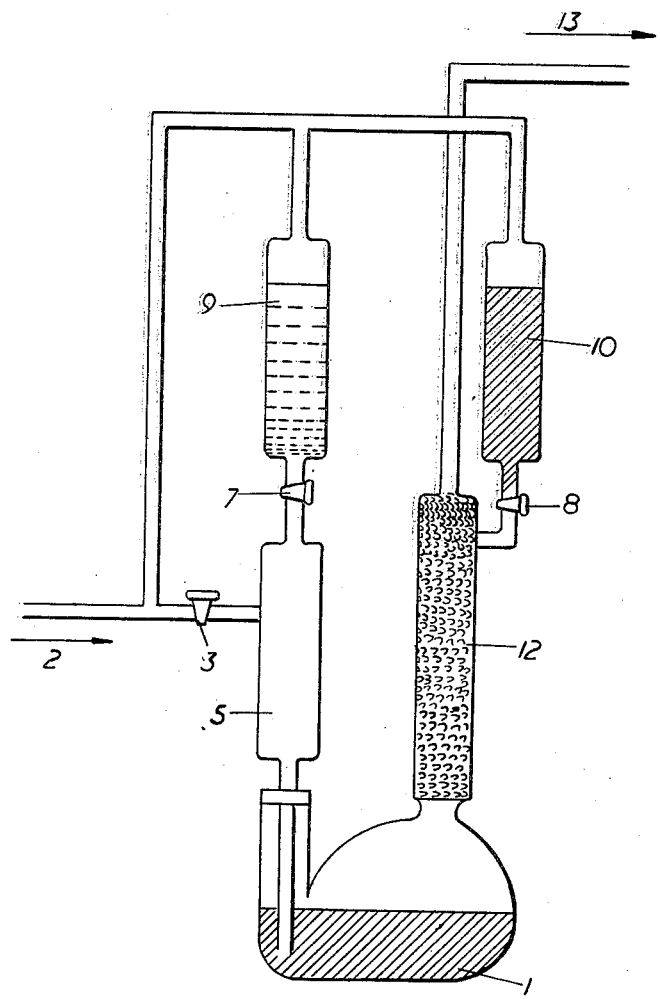
Inventor
J.M.WILSON
By 
Attorney

United States Patent Office 3,053,631
Patented Sept. 11, 1962

3,053,631
METHODS OF PRODUCING SILICON
OF HIGH PURITY
Jack McCreath Wilson, London, England, assignor to International Standard Electric Corporation, New York, N.Y., a corporation of Delaware
Original application Aug. 4, 1956, Ser. No. 604,001, now Patent No. 2,888,328, dated May 26, 1959. Divided and this application May 8, 1959, Ser. No. 811,982
Claims priority, application Great Britain Aug. 16, 1955
4 Claims. (Cl. 23—204)

The invention relates to a process for the manufacture of pure silicon, and particularly to a process to exclude the impurity boron from the silicon. This application is a division of U.S. application Serial No. 604,001, filed August 4, 1956, now U.S. Patent 2,888,328, issued May 26, 1959.

Boron is electrically one of the most important impurities in silicon and it cannot be removed from solid silicon by such known purification processes as zone refining and repeated crystal pulling. In British Patent No. 745,-698 (J. M. Wilson et al.) a method of production of very pure silicon has been described which depends upon the decomposition by heat of silane ($SiH_4$), the silane being generated by the chemical reaction of silicon tetrachloride and lithium aluminium hydride. Should the silicon tetrachloride (or the lithium aluminium hydride or the solvent for either of these) contain any boron compounds as impurities, which is often the case, diborane could be produced. Diborane, however, is a volatile hydride of boron and decomposes thermally to form boron and hydrogen. Thus when silane containing diborane is thermally decomposed so is the diborane and boron appears as an impurity in the silicon. In the process described in the parent specification, predecomposition purification of the silane was carried out at a temperature below its cracking temperature, but it has been found that this is not adequate to remove boron completely.

It is accordingly the object of the present invention completely to eliminate the presence of diborane in the silane.

In order to clearly understand the principle of the invention it is necessary firstly to consider the method of preparation of diborane consisting of reacting boron trichloride with lithium aluminium hydride.

It has been shown by several workers that the order of addition of the reagents determines the course of the reaction. Thus when an ethereal slurry of lithium aluminium hydride is added to a solution of boron trichloride in ether a steady evolution of diborane occurs according to the equation $$3LiAlH_4 + 4BCl_3 = 3LiCl + 3AlCl_3 + 2B_2H_6$$

When the reagents are addd in the reverse order and boron trichloride is added to lithium aluminium hydride, a negligible amount of diborane is generated until 50% of the stoichiometric amount of boron trichloride has been added. The explanation is that in this case there is a stepwise reaction, lithium borohydride being formed as an intermediate product. No diborane is formed until the whole of the lithium aluminium hydride has been converted to borohydride.

$$LiAlH_4 + BCl_3 = LiBH_4 + AlCl_3$$
$$3LiBH_4 + BCl_3 = 3LiCl + 2B_2H_6$$

In accordance with the present invention, in the manufacture of silicon by the reaction of a solution of silicon tetrachloride with a liquid suspension of lithium aluminium hydride to produce silane and the subsequent thermal decomposition of the silane, the said reaction is carried out by adding a solution of silicon tetrachloride to the lithium aluminium hydride and maintaining an excess of lithium aluminium hydride, whereby the amount of diborane produced from impurities in the reagents is kept to a minimum.

An embodiment of the invention will now be described with reference to the accompanying drawing which shows diagrammatically an apparatus for carrying out the invention.

A suspension of lithium aluminium hydride in tetrahydrofuran is prepared in vessel 1 and tap funnel 10, and of silicon tetrachloride in tetrahydrofuran in the upper part of tap funnel 9.

A stream of inert gas such as argon, nitrogen, or hydrogen is passed into vessel 1 from an inlet pipe 2 through tap 3, and through the lower part of the funnel 5. This sweeps all the air out of vessel 1. After an interval a quantity of lithium aluminium hydride solution contained in tap funnel 10 is added to that already contained in vessel 1 by the opening of tap 8 which allows the hydride to flow through a tube 12 packed with material to give large surface exposure. Tap 8 is then closed and tap 7 opened to allow an equivalent stoichiometric amount of silicon tetrachloride to flow into vessel 1 from the upper half of tap funnel 9. The process of alternately opening taps 7 and 8 to allow equivalent stoichiometric amounts of lithium aluminium hydride and silicon tetrachloride to pass into vessel 1 is continued. The silane reaction thus takes place in an excess of lithium aluminium hydride and the substantially pure silane thus generated.

Any silicon tetrachloride, which may contain boron trichloride, which may also become entrained in the gas stream, is removed by passing the gas stream through the packed tube 12 down which the solution of lithium aluminium hydride flows. This process also removes any diborane which may have been formed, in parts of the apparatus between the generator flask and the packed column, by reaction between any lithium aluminium hydride and silicon tetrachloride, containing boron compounds as impurities, which have become entrained in the gas stream. This process could also be used if for any reason the first stage of the process was not carried out. After passing through condensers, etc. which prevent any of the reactants passing along with the gas, the gas stream, now consisting only of the inert gas and silane, is then passed via pipe 13 to the apparatus wherein the silane is decomposed.

It is to be understood that the apparatus is provided with all the necessary trap joints between the different portions thereof. All the enclosing walls and pipes shown should be made of high purity silica. The silica of which vessel 1 in particular is made, and preferably also other vessels and tubes, should be free from any boron or other material which may form a significant impurity in the silicon.

By preparing the silane as described above, the resulting silicon had a boron content below the detection limit of the analytical method (i.e. below 0.2 p.p.m.).

It is to be understood that there may be interposed between the tube 13 and the vessel in which the silane is thermally decomposed, a vessel heated to a temperature lower than the decomposition temperature of silane but high enough to decompose completely other hydrides which may exist as impurities in the silane, and perhaps any small traces of borane which may remain.

It may be noted that the use of tetrahydrofuran for forming solutions or suspensions of the reactants is preferable to the use of ether because of the higher flash point of the former. This has been found to reduce the chances of explosion in the plant used. This plant has been considered to be extremely dangerous when ether has been used.

While the principles of the invention have been described above in connection with specific embodiments, and particular modifications thereof, it is to be clearly understood that this description is by way of example and not as a limitation on the scope of the invention.

What is claimed is:

1. A process of manufacture of substantially pure silane by the reaction of silicon tetrachloride having boron present as an impurity, with lithium aluminium hydride to produce silane, comprising carrying out said reaction by adding said silicon tetrachloride to a quantity of lithium aluminum hydride to produce silane gas having as an impurity some diborane gas as a resulting reaction product, and passing the silane produced by said reaction through a passage filled with packing holding a liquid suspension of lithium aluminium hydride to remove diborane present in the silane.

2. A process as claimed in claim 1, in which said liquid suspension of lithium aluminium hydride is a suspension in tetrahydrofuran.

3. A process of manufacture according to claim 1, further comprising adding lithium aluminium hydride, said quantity to maintain an excess of said lithium aluminium hydride during said reaction to minimise the production of diborane.

4. A process of manufacture of silane substantially free from diborane as an impurity, by the reaction of silicon tetrachloride having boron present as an impurity, with lithium aluminium hydride, comprising adding said silicon tetrachloride to a quantity of lithium aluminium hydride in a suspension in tetrahydrofuran, said suspension having an excess of said lithium aluminium hydride, to produce silane gas having as a resulting reaction product some diborane gas, passing said produced gases through a passage filled with packing, and adding a suspension of lithium aluminium hydride to said quantity through the packing in said passage, whereby diborane gas is removed in passing through said passage and excess of lithium aluminium hydride is maintained in said quantity.

References Cited in the file of this patent

UNITED STATES PATENTS

| 2,805,982 | Swinehart et al. | Sept. 10, 1957 |
| 2,970,040 | Conn | Jan. 31, 1961 |
| 2,987,139 | Bush | June 6, 1961 |

FOREIGN PATENTS

| 745,698 | Great Britain | Feb. 29, 1956 |

OTHER REFERENCES

Wartik et al.: "Journal of the American Chemical Society," vol. 75, p. 836 (1953).